United States Patent
Ito (10) Patent No.: US 7,193,755 B2
(45) Date of Patent: Mar. 20, 2007

(54) OPTICAL IMAGE READER

(75) Inventor: Naoki Ito, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 372 days.

(21) Appl. No.: 10/947,456

(22) Filed: Sep. 21, 2004

(65) Prior Publication Data

US 2005/0088545 A1  Apr. 28, 2005

(30) Foreign Application Priority Data

Oct. 22, 2003  (JP)  ............................. 2003-361775

(51) Int. Cl.
*G02B 5/32* (2006.01)
(52) U.S. Cl. ........................... 359/15; 359/34; 382/124
(58) Field of Classification Search ................. 359/15, 359/34, 1, 2; 382/124–127, 321
See application file for complete search history.

(56) References Cited

U.S. PATENT DOCUMENTS

| 5,696,607 | A | | 12/1997 | Yamana et al. | |
| 6,061,463 | A | * | 5/2000 | Metz et al. | ................. 382/124 |
| 2006/0039049 | A1 | * | 2/2006 | Carver et al. | ................. 359/32 |

FOREIGN PATENT DOCUMENTS

| JP | 09-116703 | 5/1997 |
| JP | 09116703 | 5/1997 |
| JP | 2000-115455 | 4/2000 |
| JP | 2000115455 | 4/2000 |
| WO | WO 96/11450 | 4/1996 |
| WO | WO 98/04650 | 2/1998 |
| WO | WO 03/010607 A2 | 2/2003 |

OTHER PUBLICATIONS

European Search Report dated Nov. 8, 2005 from corresponding European Application No. 04 256 283.5.

* cited by examiner

*Primary Examiner*—Leonidas Boutsikaris
(74) *Attorney, Agent, or Firm*—BeyerWeaver LLP (57) ABSTRACT

An optical image reader includes a transparent light guide plate having an object placement surface, an illumination light source for emitting light to an end face of the plate, a holographic diffraction grating element disposed at a surface of the plate opposite to the object placement surface via a low refraction index layer, a sensor unit disposed near an end face of the diffraction grating element via a light-condensing optical system, and a control circuit connected to the diffraction grating element and sensor unit. The control circuit performs controlling so that linear areas to which an electrical field is applied are successively selected in the extension direction of the object placement surface, successively receives electrical signals output in linear area units from the sensor unit, converts them into pieces of linear image information, and joins these pieces of linear image information to produce a two-dimensional image.

10 Claims, 4 Drawing Sheets

OPTICAL IMAGE READER

BACKGROUND OF THE INVENTION

1. Field of the Invention

The present invention relates to an optical image reader making use of a diffraction effect by a hologram.

2. Description of the Related Art

An optical image reader which is generally and conventionally known as a flat head type operates on the basic principle of linearly reading an object image with an optical system primarily comprising an illuminator, a mirror, a lens, and a charge coupled device (CCD) line sensor. The optical image reader forms a two-dimensional image by successively repeating imaging of linear images and joining these linear images. The imaging is carried out while mechanically driving and unidirectionally moving a carriage of the optical system. (For example, refer to Japanese Unexamined Patent Application Publication Nos. 9-116703 and 2000-115455.) In order to move the carriage, such an optical image reader requires, for example, a motor for converting electrical energy into mechanical energy, a rail for supporting the carriage, and a shaft for converting rotational energy generated by the motor into a driving force in a unidimensional direction.

However, in the above-described optical image reader, the structure for mechanically moving the carriage is complicated. In addition, it is very difficult to downsize the optical image reader to a portable size.

SUMMARY OF THE INVENTION

The present invention has been achieved in view of the above-described drawbacks, and has as its object the provision of an optical image reader which can carry out two-dimensional imaging without using a driving mechanism and which can be reduced in size.

To this end, according to a first aspect of the present invention, there is provided an optical image reader comprising a transparent light guide plate having an object placement surface, an illumination light source for emitting light to an end face of the transparent light guide plate, a holographic diffraction grating element disposed at a surface of the transparent light guide plate opposite to the object placement surface via a transparent low refraction index layer having a refraction index that is lower than that of a material of the transparent light guide plate, a sensor unit disposed near an end face of the holographic diffraction grating element via a light-condensing optical system, and a control circuit connected to the holographic diffraction grating element and the sensor unit. The transparent light guide plate receives the light emitted from the illumination light source from the end face thereof, and causes the light that propagates through the transparent light guide plate and that is scattered by an object placed on the object placement surface to exit towards the low refraction index layer from the surface opposite to the object placement surface. The low refraction index layer totally reflects the light which propagates through the light guide plate, transmits a portion of the scattered light which has exited from the light guide plate, and causes the light to exit towards the holographic diffraction grating element. The holographic diffraction grating element has a diffraction efficiency changing layer whose diffraction efficiency changes by an applied electrical field strength, an electrical field being applied to selected linear areas of the diffraction efficiency changing layer and the scattered light that has exited from the low refraction index layer being diffracted at the selected linear areas to which the electrical field has been applied. The light-condensing optical system is disposed on an optical axis extending in a direction in which the scattered light is diffracted at the linear areas and focuses the diffracted light on the sensor unit in linear area units. The sensor unit converts the intensities of the focused light into electrical signals and outputs the electrical signals to the control circuit. The control circuit performs a controlling operation so that the linear areas to which the electrical field is applied are successively selected in the direction of extension of the object placement surface, successively receives the electrical signals output in linear area units from the sensor unit, converts the electrical signals into pieces of linear image information, and joins these pieces of linear image information in order to produce a two-dimensional image.

In the optical image reader of the first aspect, light (illumination light) emitted to the transparent light guide plate from the illumination light source propagates through the transparent light guide plate while being repeatedly totally reflected by the surfaces of the light guide plate. In addition, the low refraction index layer disposed between the surface of the transparent light guide plate opposing the object placement surface and the holographic diffraction grating element makes it possible to increase propagation by total reflection of the illumination light through the transparent light guide plate.

A portion of the illumination light propagating in the transparent light guide plate is scattered by striking a portion of an object placed on the object placement surface, and a portion of the scattered light passes through the low refraction index layer and impinges upon the holographic diffraction grating. In the holographic diffraction grating, the diffraction efficiency is increased by successively applying an electrical field to linear areas of the diffraction efficiency changing layer by the control circuit, the light which has exited from the low refraction index layer is diffracted by the linear areas to which the electrical field has been applied, and the diffracted light passes through areas where the electrical field has not been applied in order to be focused on the sensor unit by the light-condensing optical system in linear area units. The sensor unit converts the intensities of the focused light into electrical signals, and outputs the electrical signals to the control circuit. The control circuit can produce a two-dimensional image by successively receiving the electrical signals output from the sensor unit in linear area units, converting the electrical signals into pieces of linear image information, and combining these pieces of linear image information.

According to a second aspect of the present invention, there is provided an optical image reader comprising a first holographic diffraction grating element having an object placement surface and a diffraction efficiency changing layer whose diffraction efficiency changes by an applied electrical field strength, an electrical field being applied to selected linear areas of the diffraction efficiency changing layer; an illumination light source for emitting light to an end face of the first holographic diffraction grating element; a second holographic diffraction grating element disposed at a surface of the first holographic diffraction grating element opposite to the object placement surface via a transparent low refraction index layer having a refraction index that is lower than that of the opposite surface; a sensor unit disposed near an end face of the second holographic diffraction grating element via a light-condensing optical system; and a control circuit connected to the first and second holographic diffraction grating elements and the sensor unit. The first holographic diffraction grating element receives the light emitted from the illumination light source from the end face thereof, diffracts the light which propagates through the first holographic diffraction grating element towards the object placement surface by the linear areas to which the electrical field has been applied, and causes the diffracted light that is scattered by an object placed on the object placement surface to exit towards the low refraction index layer from the surface opposite to the object placement surface. The low refraction index layer totally reflects the light which propagates through the first holographic diffraction grating element, transmits a portion of the scattered light which has exited from the first holographic diffraction grating element, and causes the light to exit towards the second holographic diffraction grating element. The second holographic diffraction grating element has a diffraction efficiency changing layer whose diffraction efficiency changes by an applied electrical field strength, an electrical field being applied to selected linear areas of the diffraction efficiency changing layer and the scattered light that has exited from the low refraction index layer being diffracted at the selected linear areas to which the electrical field has been applied. The light-condensing optical system is disposed on an optical axis extending in a direction in which the scattered light is diffracted at the linear areas and focuses the diffracted light on the sensor unit in linear area units. The sensor unit converts the intensities of the focused light into electrical signals and outputs the electrical signals to the control circuit. The control circuit performs a controlling operation so that the linear areas to which the electrical field is applied of the first and second holographic diffraction grating elements are successively selected in the direction of extension of the object placement surface, successively receives the electrical signals output in linear area units from the sensor unit, converts the electrical signals into pieces of linear image information, and joins these pieces of linear image information in order to produce a two-dimensional image.

In the optical image reader of the second aspect, it is possible to concentrate more illumination light at object imaging areas with the first holographic diffraction grating element instead of the transparent light guide plate used in the first aspect, so that, for example, the S/N ratio of the image after imaging is increased and the power of the illumination light source is saved.

The optical image reader may be formed so that the diffraction efficiency changing layer of the (or each) holographic diffraction grating element is sandwiched between a pair of transparent substrates, transparent electrodes for applying the electrical field to the (or each) diffraction efficiency changing layer are disposed on the inner sides of the transparent substrates, and the (or each) diffraction efficiency changing layer has first areas having an isotropic refraction index and second areas having a refraction index that is different from that of the first areas by the application of the electrical field.

Since the (or each) holographic diffraction grating element comprises a diffraction efficiency changing layer comprising first areas having an isotropic refraction index and second areas having a refraction index that is different from that of the first areas by application of an electrical field, when a voltage is applied between selected transparent electrodes, the electrical field is applied to the linear areas between the transparent electrodes to which the voltage has been applied, thereby producing a difference between the refraction indices of the first and second areas disposed in the linear areas. Therefore, the scattered light that has exited from the low refraction index layer undergoes Bragg diffraction. Here, there is a close relationship between the degree of the diffraction efficiency and the extent of the difference between the refraction index of the first areas and that of the second areas. Only light having, for example, a wavelength and an angle of incidence satisfying particular conditions is diffracted instead of any light.

The optical image reader may be formed so that the low refraction index layer totally reflects the light having an angle of incidence that is greater than $\sin^{-1}(n_h/n_l)$, and transmits the light having an angle of incidence that is equal to or less than $\sin^{-1}(n_h/n_l)$ (where $n_h$ is the refraction index of the transparent light guide plate or the surface of the first holographic diffraction grating element adjacent to the low refraction index layer, and $n_l$ is the refraction index of the low refraction index layer).

The optical image reader may be formed so that the light to be diffracted by the linear areas to which the electrical field (or electrical fields) has (have) been applied satisfies the following Bragg condition:

$$2\Lambda \cdot \sin \theta_i' = \lambda'$$

where $\Lambda$ represents the refraction index distribution period of the (or each) diffraction efficiency changing layer, $\theta_i'$ represents the angle between an equal refraction index surface in the (or each) diffraction efficiency changing layer and a light incidence path in the (or each) diffraction efficiency changing layer, and $\lambda'$ represents the effective wavelength of the light in the (or each) diffraction efficiency changing layer.

The optical image reader may be formed so that a transparent low refraction index layer is disposed at the object placement surface.

According to the present invention, it is possible to provide an optical image reader which can perform two-dimensional imaging without using a driving mechanism and which can be reduced in size.

This is due to the following reasons. Whereas, in the related flat head optical image reader, a reading location is scanned by moving the carriage, in the present invention, two-dimensional imaging can be achieved by successively scanning linear areas having high diffraction efficiency of the holographic diffraction grating. In addition, whereas, in the related reader, it is necessary to illuminate a limited area near a reading location with illumination light, in the present invention, only light having, for example, a wavelength and an angle of incidence satisfying particular conditions (more specifically, light which propagates from a particular direction and satisfies the Bragg diffraction condition) is diffracted, so that the location of illumination does not need to be necessarily limited.

DESCRIPTION OF THE PREFERRED EMBODIMENTS

Next, embodiments of the present invention will be described in detail with reference to the relevant drawings.

Obviously, the present invention is not limited to the embodiments that are described below, and parts are drawn to different scales that allow the parts to be easily denoted.

(First Embodiment)

Figure 1:
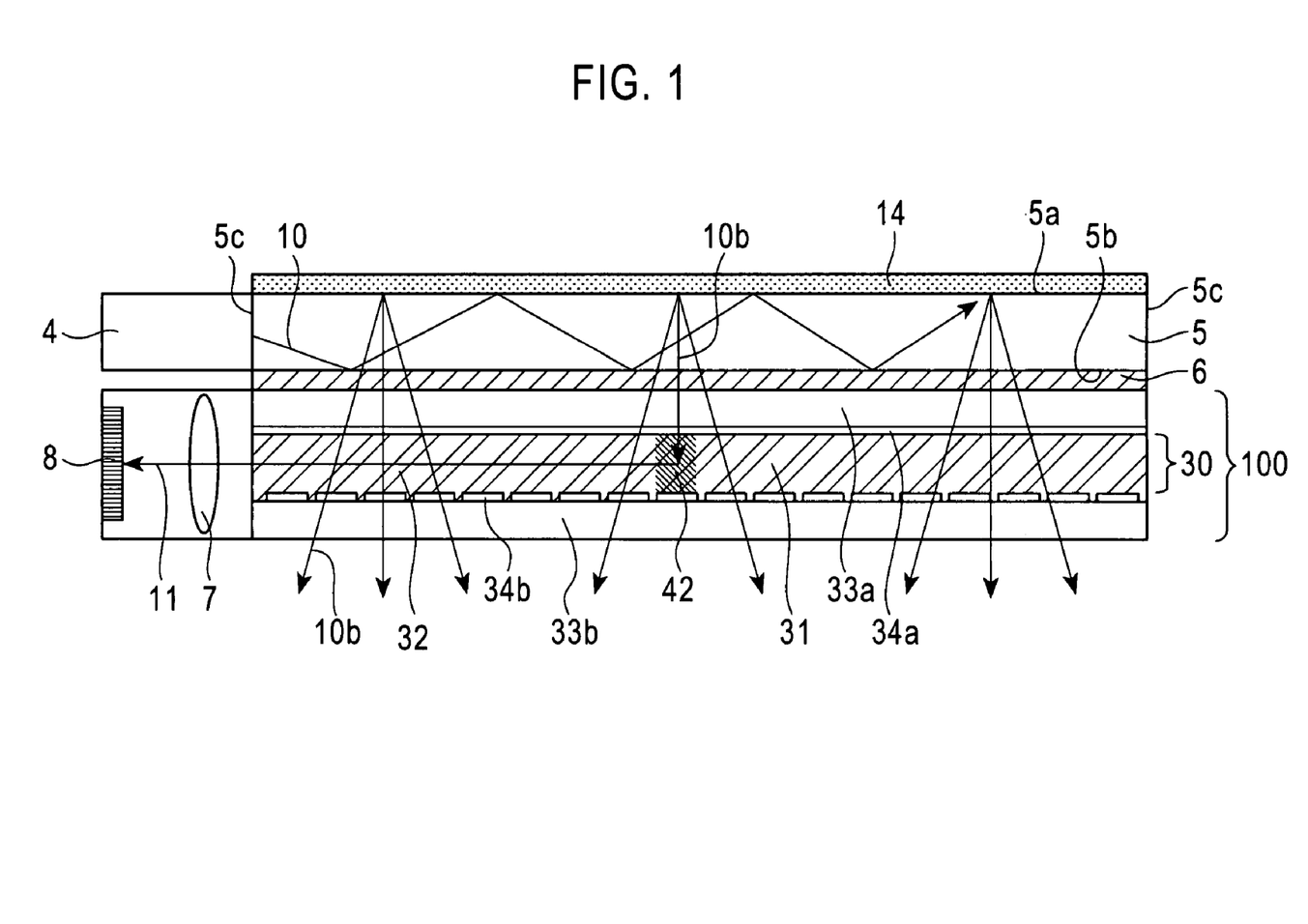
FIG. 1 is a schematic sectional view of the structure of an optical image reader in accordance with a first embodiment of the present invention.

FIG. 1 is a schematic view of the structure of an optical image reader of a first embodiment of the present invention. FIG. 1 illustrates typical paths of illumination light and an object in order to describe the function of the optical image reader of the first embodiment.

The optical image reader of the embodiment generally comprises a transparent light guide plate 5 having an object placement surface 5a, an illumination light source 4 for emitting light (illumination light) 10 to an end face 5c of the transparent light guide plate 5, a holographic diffraction grating element 100 disposed at a side of the transparent light guide plate 5 opposing the object placement surface 5a through a transparent low refraction index layer 6 having a lower refraction index than the material of the transparent light guide plate, a sensor unit 8 disposed near an end face of the holographic diffraction grating element 100 through a light condensing optical system 7, and a control circuit (not shown) connected to the holographic diffraction grating element 100 and the sensor unit 8.

The illumination light source 4 is disposed beside the end face 5c of the light guide plate 5, and primarily comprises a light emitter and a light guide. The light emitter is, for example, a laser diode (LD), a light emitting diode (LED), or a cold cathode tube (CCFL). The light guide efficiently guides the light emitted from the light emitter to the transparent light guide plate 5. The illumination light 10 emitted from the light emitter may be any one of a monochromatic light, white light, and light which is a synthesis of three primary colors (red, green, and blue). In the embodiment, monochromatic light is used as the illumination light 10. When the illumination light 10 is monochromatic light, an image after imaging is monochromatic.

It is desirable that the light guide be formed of a material that is sufficiently transparent to visible light. Therefore, optical glass (synthetic quartz or alkali free glass) is used for the material of the light guide.

The material of the transparent light guide plate 5 (the transparent light guide plate material) is optical glass or plastic. It is sufficiently transparent to the visible range (380 nm to 780 nm) and is desirably transparent to a wavelength range of from the wavelength of ultraviolet light (330 nm or more) to the wavelength of near infrared light (1600 nm or less), and has a refraction index of from 1.4 to 1.9 in the visible range.

When using the optical image reader of the embodiment, an object 14 is disposed in close contact with the object placement surface 5a of the transparent light guide plate 5.

The low refraction index layer 6 is disposed at a surface (light-exiting surface) 5b of the transparent light guide plate 5 opposing the object placement surface 5a, has a refractive index that is lower than that of the transparent light guide plate material in the range of from the wavelength of visible light to the wavelength of near infrared light, and is transparent.

The low refraction index layer 6 is used to efficiently transmit the illumination light 10 in the transparent light guide plate 5 by total reflection and to restrict direct impingement upon the holographic diffraction grating element 100 of light other than a scattered component of the light from the object 14 placed on the object placement surface 5a.

The low refraction index layer 6 may be formed by, for example, coating the light-exiting surface 5b of the transparent light guide plate 5 with low refraction index resin that is transparent to light, such as fluorocarbon polymer, or forming an air gap between the holographic diffraction grating element 100 and the light-exiting surface 5b of the transparent light guide plate 5.

The low refraction index layer 6 totally reflects light having an angle of incidence that is greater than $\sin^{-1}(n_h/n_l)$ with respect to a normal line direction of the layer, and transmits light having an angle of incidence that is equal to or less than $\sin^{-1}(n_h/n_l)$ with respect to the normal line direction. ($n_h$ is the refraction index of the transparent light guide plate 5, and $n_l$ is the refraction index of the low refraction index layer 6.)

When light impinges upon a layer having a low refraction index from a layer having a high refraction index, and the incident angle $\theta_i$ satisfies the relationship of Expression (1) below, the light is totally reflected. Therefore, it is desirable that the light guide of the illumination light source 4 be such that light which satisfies the following Expression (1) exits therefrom.

$$\theta_i > \sin^{-1}(n_h/n_l) \qquad (1)$$

(In the expression, $n_h$ represents the refraction index of the high refraction index layer, and $n_l$ represents the refraction index of the low refraction index layer.)

By virtue of the above-described structure, when imaging of the object 14 is carried out, it is possible for the illumination light 10 to be emitted from the illumination light source 4 and to enter the transparent light guide plate 5 from the end face 5c. The illumination light 10 that has entered the transparent light guide plate 5 propagates through the transparent light guide plate 5, and portions of the illumination light 10 are scattered at locations of the object 14 that is disposed in close contact with the light guide plate 5. Of the portions of the light scattered from the object 14, light portions 10b that are incident upon the low refraction index layer 6 at an angle equal to or less than $\sin^{-1}(n_h/n_l)$ pass the interface between the low refraction index layer 6 and the light guide plate 5 and reach the holographic diffraction grating element 100, whereas light portions that are incident upon the low refraction index layer 6 at an angle that is greater than $\sin^{-1}(n_h/n_l)$ are totally reflected at the interface between the low refraction index layer 6 and the light guide plate 5.

In the holographic diffraction grating element 100, a pair of transparent substrates 33a and 33b sandwich a medium layer 30 (diffraction efficiency changing layer) whose diffraction efficiency changes successively by the strength of an applied electrical field and which has a property which is the same as or equivalent to that of the transparent light guide plate 5. The inner sides of the transparent substrates 33a and 33b are patterned with transparent electrodes 34a and 34b, so that an electrical field can be applied to predetermined linear areas of the diffraction efficiency changing layer 30.

Of the transparent electrodes 34a and 34b, the transparent electrodes 34b are disposed in the form of strips on the transparent substrate 33b. The transparent electrode 34a may be formed over the entire surface of the transparent substrate 33a, or a plurality of the transparent electrodes 34a may be disposed in the form of strips. When the transparent electrodes 34a and the transparent electrodes 34b are disposed in the form of strips, they are disposed so as to overlap each other as viewed from one side of the element 100. The pitch of the electrodes 34b is equal to a width corresponding to the resolving power.

Figure 2:
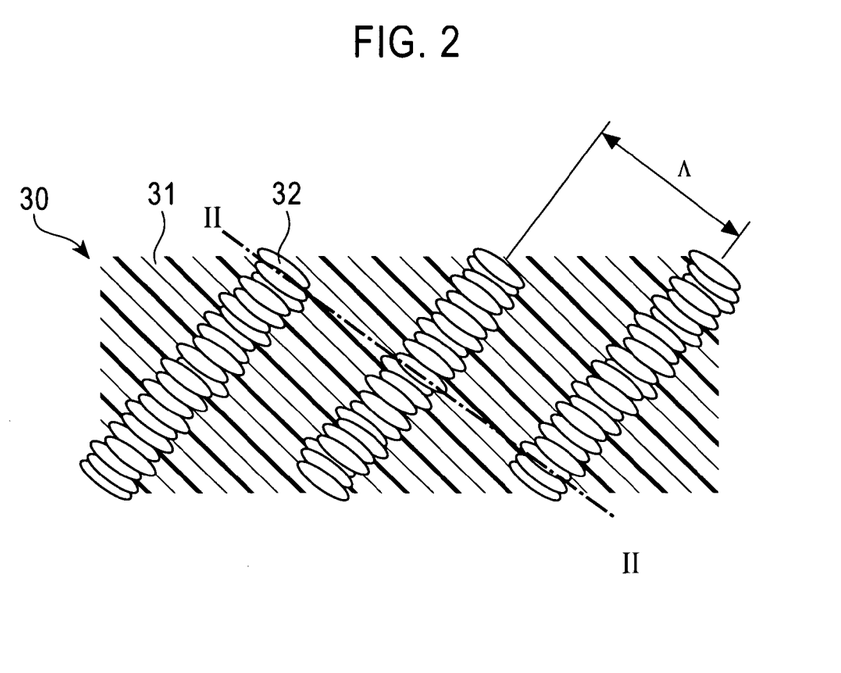
FIG. 2 is an enlarged schematic sectional view of a portion of a diffraction efficiency changing layer of a holographic diffraction grating element of the optical image reader shown in FIG. 1.

As shown in FIG. 2, the diffraction efficiency changing layer 30 is formed of a hologram recording material and has a structure in which first areas 31 and second areas 32 are periodically repeated. Each first area 31 has an isotropic refraction index. Each second area 32 has an anisotropic refraction index (uniaxial or biaxial) which differs from that of each first area 31 due to an application of an electrical field.

In the embodiment, each first area 31 is formed of polymer resin, and each second area 32 is formed of liquid crystals. A high density of the polymer resin is disposed in each first area 31 indicated by slanted lines in FIG. 2, and a high density of the liquid crystal molecules is disposed in each second area 32 shown as an elliptically shaped area in FIG. 2. The liquid crystals used in the second areas 32 are nematic liquid crystals and have a positive or a negative dielectric anisotropy. When an electrical field is applied to the liquid crystals, the liquid crystals respond to the electrical field by the dielectric anisotropy that they have and change their orientation states.

The direction in which the orientation states of the liquid crystals change depends upon whether the dielectric anisotropy of the liquid crystals is positive or negative. When the dielectric anisotropy is positive, liquid crystal molecules that move parallel to the electrical field direction are used, whereas when the dielectric anisotropy is negative, liquid crystal molecules that move perpendicular to the electrical field direction are used. By such movements of the liquid crystal molecules, the refraction index of each second area 32 changes.

PDLC disclosed in PCT Japanese Translation Patent Publication No. 2000-515996 may be used as the liquid crystals of the second areas 32.

The diffraction efficiency changing layer 30 is a volume hologram. Light satisfying the Bragg diffraction condition expressed by Expression (2) below is considerably diffracted (diffraction efficiency is high), and light that does not satisfy the Bragg diffraction condition is substantially not diffracted (diffraction efficiency is very low or zero).

$$2\Lambda \cdot \sin \theta_i' = \lambda' \quad (2)$$

(In the expression, $\Lambda$ represents the refraction index distribution period of the diffraction efficiency changing layer 30, $\theta_i'$ represents the angle between an equal refraction index surface in the diffraction efficiency changing layer and a light incidence path in the diffraction efficiency changing layer, and $\lambda'$ represents the effective wavelength of the light in the diffraction efficiency changing layer.) The equal refraction index surface is a surface in which equal refraction indices are continuously provided in a refraction index distribution of a cross section taken along line II—II of FIG. 2 when, for example, voltage is applied to a portion of the diffraction efficiency changing layer 30 shown in FIG. 2.

The diffraction efficiency changing layer 30 is formed so that the refraction index of the liquid crystals of the second areas 32 is substantially equal to the refraction index of the polymer resin of the neighboring first areas 31 when an electrical field is not applied under the Bragg condition with respect to the wavelength of the illumination light 10. Therefore, when an electrical field is not applied to the liquid crystals, the light is scattered at the object 14 and passes through the diffraction efficiency changing layer 30 without being diffracted even if some of the light portions 10b reaching the diffraction efficiency changing layer 30 satisfy the Bragg condition. Since a light component that does not satisfy the Bragg condition is not diffracted, it only passes through the diffraction efficiency changing layer 30 regardless of the state of the liquid crystals.

When an electrical field is applied to the liquid crystals of the second areas 32, the liquid crystal molecules move and change their orientations. This causes the refraction index of the liquid crystal areas that sense light under the Bragg condition to differ from the refraction index of the neighboring polymer resin (that is, the first areas 31), so that the light is diffracted. If the refraction index of the second areas 32 changes so that the difference between the refraction index of the second areas 32 and that of the neighboring first areas 31 is small, the diffraction efficiency is small. In contrast, if the refraction index of the second areas 32 changes so that the difference between the refraction index of the second areas 32 and that of the neighboring first areas 31 is large, the diffraction efficiency is large.

Therefore, if an electrical field is applied to only any linear areas 42 of the diffraction efficiency changing layer 30, only particular light satisfying the Bragg condition is diffracted at these areas. Such particular light corresponds to light scattered and exiting from locations of the object 14 corresponding to the particular linear areas 42 of the diffraction efficiency changing layer 30 to which an electrical field has been applied.

The light condensing optical system 7 is disposed on an optical axis extending in the diffraction direction of light 11. The light 11 is obtained after the light portions 10b have passed through the low refraction index layer 6, have reached the holographic diffraction grating element 100, and have been diffracted at the linear areas 42 to which an electrical field has been applied. The light condensing optical system 7 is designed so that the light 11, which is obtained by diffraction in linear area units, is focused on the sensor unit 8. Accordingly, the light 11 is focused on the sensor unit 8.

The sensor unit 8 is a sensor array in which light-receiving sections are disposed in a unidimensional direction, and uses a semiconductor line sensor unit, such as a CCD or a CMOS. The sensor unit 8 converts the intensities of the focused light into electrical signals, and outputs the electrical signals to the control circuit.

The control circuit carries out a controlling operation so that linear areas 42 to which an electrical field is applied are successively selected in the direction of extension of the object placement surface (that is, in a direction parallel to the object placement surface), successively receives electrical signals output in linear area units from the sensor unit 8, converts them into pieces of linear image information, and successively joins these pieces of linear image information regarding portions of the object 14 (linear portions) above the linear areas 42 to which the electrical field has been applied in order to produce a two-dimensional image of the object 14.

An electrical field is applied to linear areas 42 disposed at locations where the upper transparent electrode 34a and the lower transparent electrodes 34b corresponding to the linear areas 42 overlap by applying a voltage to these transparent electrodes 34a and 34b.

Here, a method for applying an electrical field to the liquid crystals will be described.

Figure 3:
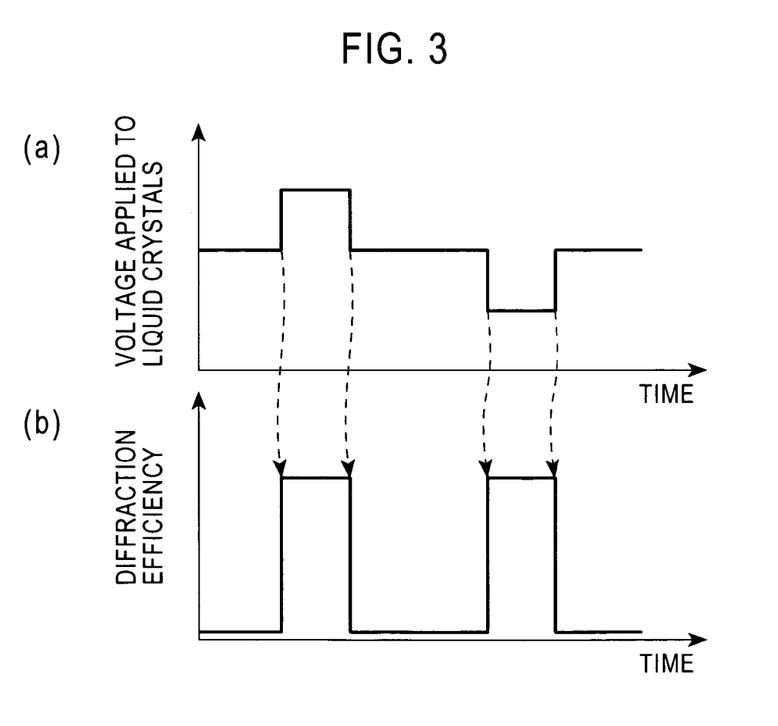
FIG. 3A shows an applied voltage waveform when an electrical field is applied for a predetermined sufficiently longer period of time than the response speed of liquid crystal molecules.
FIG. 3B is a schematic view of changes in the diffraction efficiency when the electrical field having such a waveform is applied to the liquid crystals.

FIG. 3A shows an applied voltage waveform when a positive or a negative electrical field is applied for a predetermined sufficiently longer period of time than the response speed of the liquid crystal molecules.

FIG. 3B is a schematic view showing changes in the diffraction efficiency when the electrical field having such a waveform is applied to the liquid crystals. Actually, a delay in the rising and falling in the waveform occurs by the response speed of the liquid crystals. Since the nematic liquid crystals respond to an effective value of the electrical field, a difference in change of the diffraction efficiency is not produced due to a difference in the polarity of the electrical field. However, this method has a definite disadvantage. That is, when ionic impurities which move by the electrical field are mixed among the liquid crystals, field reversing caused by the ionic impurities weakens the effective electrical field applied to the liquid crystals.

Figure 4:
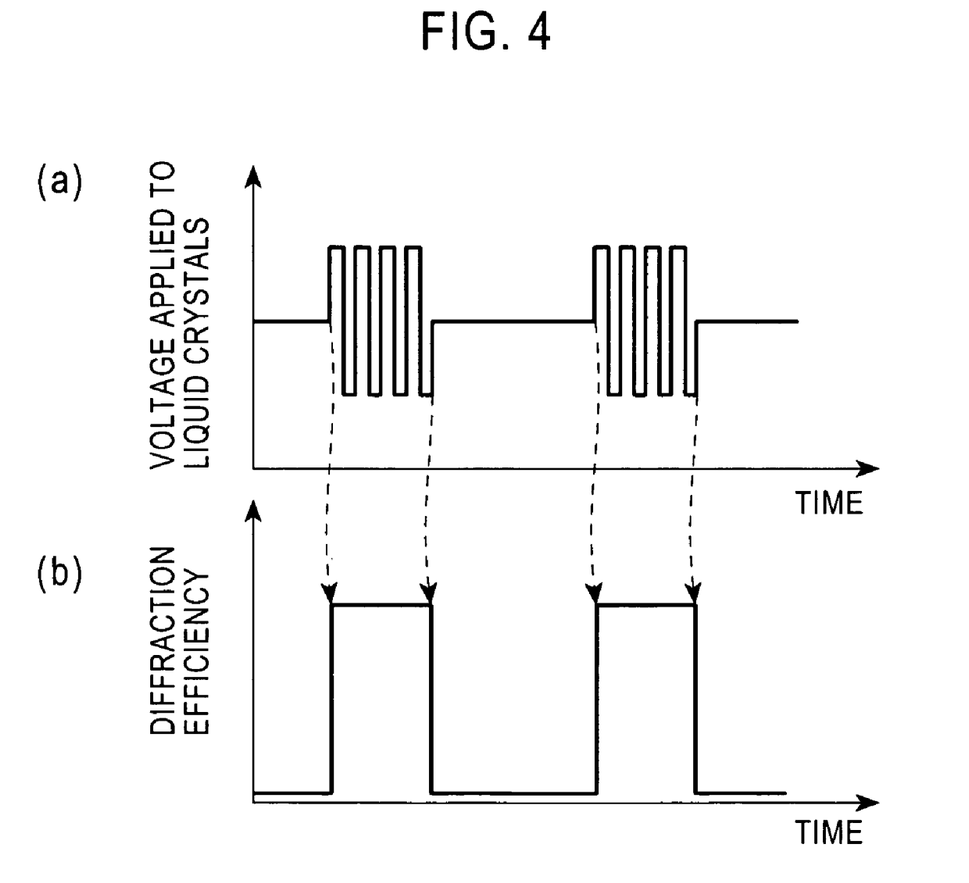
FIG. 4A shows an applied voltage waveform when the positive and negative polarities of the electrical field are reversed in the form of pulses for a sufficiently shorter period of time than the response speed of liquid crystal molecules.
FIG. 4B is a schematic view of changes in the diffraction efficiency when the electrical field having such a waveform is applied to the liquid crystals.

To overcome this problem, a driving method shown in FIG. 4 is provided.

FIG. 4A shows an applied voltage waveform when the positive and negative polarities of the electrical field are reversed in the form of pulses for a sufficiently shorter period of time than the response speed of the liquid crystals. Since the nematic liquid crystals respond to an effective value of the electrical field, they do not follow polarity changes of the electrical field in a short time. This gives rise to changes in the diffraction efficiency of the holographic diffraction grating element 100 as shown in FIG. 4B. The feature of this method is that it is possible to reduce the effects of the field reversing caused by the ionic impurities described with reference to FIG. 3 when the period of the polarity reversal of the electrical field is longer and their movement is sufficiently faster than the response speed of the liquid crystals.

According to the embodiment, since two-dimensional imaging can be carried out by successively scanning linear areas of the holographic diffraction grating having a high diffraction efficiency, a driving mechanism such as a carriage is not required. Therefore, it is possible to provide a downsized optical image reader. When 500 electrodes 34b are disposed at a pitch of 50 μm, and when the response speed of the PDLC is 200 μs, the optical image reader of the embodiment can carry out imaging of an object at an imaging speed of 100 ms.

(Second Embodiment)

Figure 5:
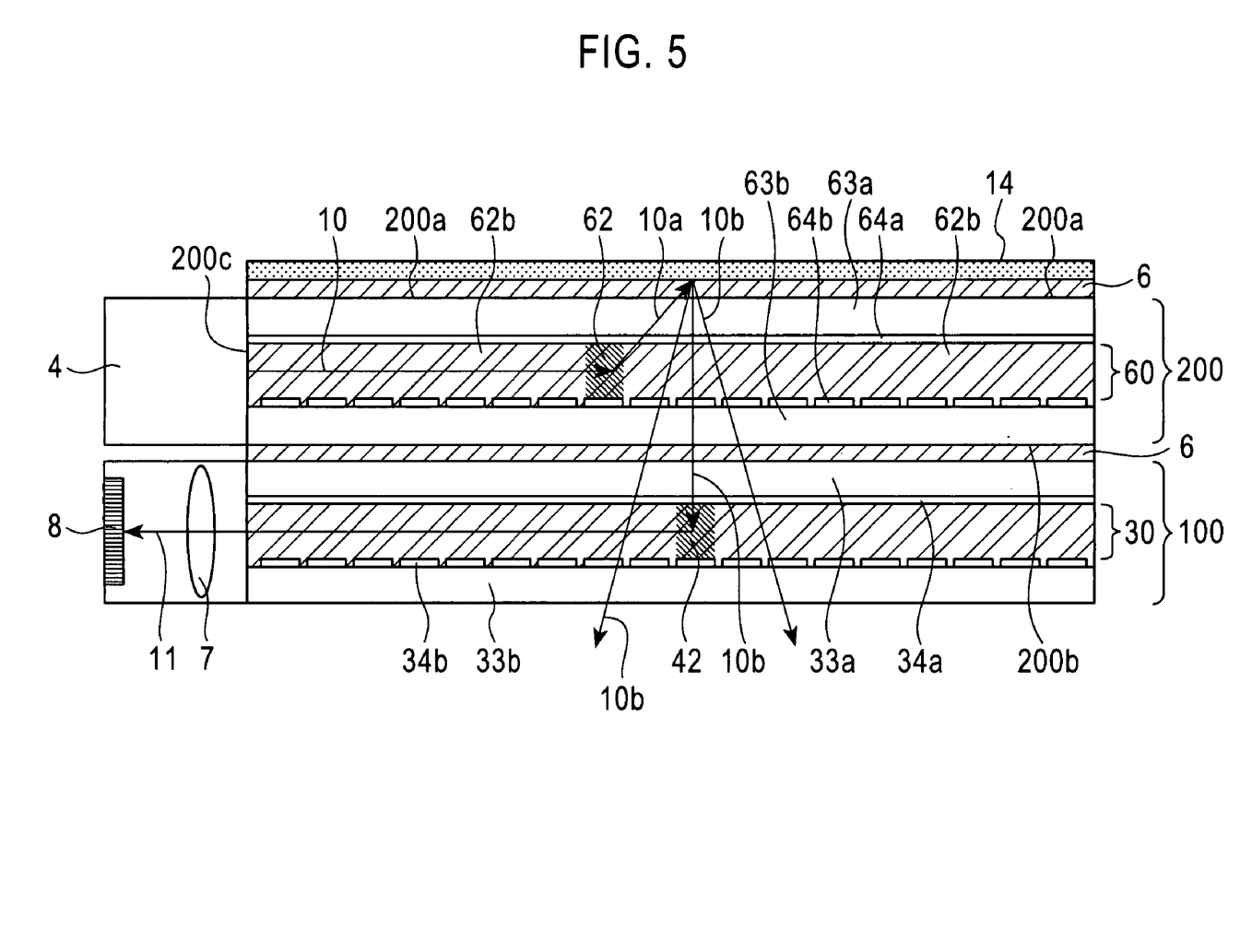
FIG. 5 is a schematic sectional view of the structure of an optical image reader in accordance with a second embodiment.

FIG. 5 is a schematic view of the structure of an optical image reader of a second embodiment of the present invention. FIG. 5 illustrates typical paths of illumination light and an object in order to describe the function of the optical image reader of the second embodiment.

The optical image reader of the embodiment comprises a holographic diffraction grating element 200 (which may also be called a first holographic diffraction grating element in the embodiment) instead of the transparent light guide plate 5 of the optical image reader of the first embodiment shown in FIG. 1.

In the structure of the first holographic diffraction grating element 200, a diffraction efficiency changing layer 60, which is similar to the diffraction efficiency changing layer 30 in the first embodiment, is sandwiched by a pair of transparent substrates 63a and 63b, and the inner sides of the transparent substrates 63a and 63b are patterned with transparent electrodes 64a and 64b, so that an electrical field can be applied to predetermined linear areas 62 of the diffraction efficiency changing layer 60.

Of the transparent electrodes 64a and 64b, the transparent electrodes 64b are disposed in the form of strips on the transparent substrate 63b. The transparent electrode 64a may be formed over the entire surface of the transparent substrate 63a, or a plurality of the transparent electrodes 64a may be disposed in the form of strips. When the transparent electrodes 64a and the transparent electrodes 64b are disposed in the form of strips, they are disposed so as to overlap each other as viewed from one side of the element 200.

The diffraction efficiency changing layer 60 is formed of a hologram recording material and has a structure in which first areas and second areas similar to those in the first embodiment are periodically repeated. Each first area has an isotropic refraction index. Each second area has an anisotropic refraction index (uniaxial or biaxial). Even in the second embodiment, as in the first embodiment, each first area is formed of polymer resin, and each second area is formed of liquid crystals.

The top surface of the holographic diffraction grating element 200 (that is, the surface of the transparent substrate 63a) corresponds to an object placement surface 200a.

An illumination light source 4 is disposed beside the holographic diffraction grating element 200 so that illumination light 10 can be emitted to an end face 200c of the element 200.

Through a low refraction index layer 6, a holographic diffraction grating element 100 (which may be called a second holographic diffraction grating element in the embodiment) is disposed at a surface 200b (which is also a light-exiting surface as well as a surface of the transparent substrate 63b) opposing the object placement surface 200a of the holographic diffraction grating element 200. A sensor unit 8 is disposed near an end face of the holographic diffraction grating element 100 through a light-condensing optical system 7. A control circuit (not shown) is connected to the holographic diffraction grating elements 100 and 200 and to the sensor unit 8.

The low refraction index layer 6 used in the embodiment is formed of a transparent material that has a lower refraction index than transparent substrates at the holographic diffraction grating element 100.

Another low refraction index layer 6 is disposed at the object placement surface 200a of the holographic diffraction grating element 200. Disposing the low refraction index layers 6 at both the top and bottom surfaces (that is, the object placement surface and the light-exiting surface) of the holographic diffraction grating element 200 increases light propagation by total reflection in the holographic diffraction grating element 200.

The control circuit used in the embodiment carries out a controlling operation so that linear areas 42 and linear areas 62 to which an electrical field is applied of the holographic diffraction grating elements 100 and 200 are successively selected in the direction of extension of the object placement surface 200a, successively receives electrical signals output in linear area units from the sensor unit 8, converts them into pieces of linear image information, and joins these pieces of linear image information in order to produce a two-dimensional image of an object 14.

An electrical field is applied to linear areas 62 disposed at locations where the upper transparent electrode 64a and the lower transparent electrodes 64b corresponding to the linear areas 62 overlap by applying a voltage to the transparent electrodes 64a and 64b.

An electrical field is applied to linear areas 42 disposed at locations where an upper transparent electrode 34a and lower transparent electrodes 34b corresponding to the linear areas 42 overlap by applying a voltage to the transparent electrodes 34a and 34b.

By virtue of the above-described structure, when carrying out imaging the object 14, it is possible for the illumination light 10 to be emitted from the illumination light source 4 and enter the diffraction efficiency changing layer 60 from the end face 200c. The illumination light 10 that has entered the diffraction efficiency changing layer 60 propagates through areas 62b to which an electrical field is not applied, and a component of the propagation light that satisfies the Bragg diffraction condition is diffracted in the direction of the object placement surface 200a (a predetermined direction) at linear areas 62 to which an electrical field is successively applied and becomes diffracted light 10a. The diffracted light 10a strikes a portion of the object 14 disposed on the object placement surface through the low refraction index layer 6, and is scattered there. Portions 10b of the scattered light pass through the areas 62b of the holographic diffraction grating element 200 to which the electrical field is not applied, exit from a light-exiting surface 200b towards the low refraction index layer 6 disposed below the light-exiting surface 200b (or adjacent the element 100), pass through the low refraction index layer 6, and impinge upon the holographic diffraction grating 100. In the holographic diffraction grating 100, the control circuit successively applies the electrical field to the linear areas 42 of the diffraction efficiency changing layer in order to increase the diffraction efficiency. Of the light portions 10b that have exited from the low refraction index layer 6, any light portion 10b that satisfies the Bragg diffraction condition is successively diffracted at the associated linear area 42 to which the electrical field has been applied, and becomes diffracted light 11. The diffracted light 11 is focused on the sensor unit 8 in linear area units by the light-condensing optical system 7. The sensor unit 8 converts the intensities of the focused light into electrical signals, and outputs the electrical signals to the control circuit. The control circuit successively receives the electrical signals output in linear area units, converts them into pieces of linear image information, and successively joins these pieces of linear image information regarding portions (linear portions) of the object 14 above the linear areas 42 to which the electrical field has been applied in order to produce a two-dimensional image of the object 14.

It is desirable that the location of each linear area 42 to which the electrical field is applied be controlled so that each linear area 42 is disposed at the center of the light that is diffracted by the linear areas 62 to which the electrical field is applied, that strikes a portion of the object 14 and is scattered by the object 14, and that exits towards the element 200. (The center of the light is where the intensity of the scattered light is greatest.)

As can be understood from the foregoing description, in the optical image reader of the second embodiment, a larger amount of illumination light can be concentrated at the imaging areas of the object 14 by using the holographic diffraction grating 200 instead of the transparent light guide plate 5 used in the first embodiment. As a result, it is possible to, for example, increase the S/N ratio of an image after imaging and to save power of the illumination light source.

Similarly to a related optical image reader, the optical image reader of the present invention is primarily used to read information on, for example, characters or figures, printed or hand-written on a sheet serving as an object, as two-dimensional image data. Since the optical image reader can read finger print information if a finger instead of a sheet is placed as an object on the object placement surface, it can function as a finger print sensor.

If the illumination light source is turned off and the holographic diffraction grating element is in a nondiffraction state, the transparency is maintained. Therefore, for example, if the optical image reader is disposed on a display surface of a portable information terminal of, for example, a cellular phone having a liquid crystal display element disposed at its display surface, a portable information terminal having an optical image reader can be provided.

What is claimed is:

1. An optical image reader comprising:

a transparent light guide plate having an object placement surface;

an illumination light source for emitting light to an end face of the transparent light guide plate;

a holographic diffraction grating element disposed at a surface of the transparent light guide plate opposite to the object placement surface via a transparent low refraction index layer having a refraction index that is lower than that of a material of the transparent light guide plate;

a sensor unit disposed near an end face of the holographic diffraction grating element via a light-condensing optical system; and a control circuit connected to the holographic diffraction grating element and the sensor unit, wherein the transparent light guide plate receives the light emitted from the illumination light source from the end face thereof, and causes the light that propagates through the transparent light guide plate and that is scattered by an object placed on the object placement surface to exit towards the low refraction index layer from the surface opposite to the object placement surface, the low refraction index layer totally reflects the light which propagates through the light guide plate, transmits a portion of the scattered light which has exited from the light guide plate, and causes the light to exit towards the holographic diffraction grating element, the holographic diffraction grating element has a diffraction efficiency changing layer whose diffraction efficiency changes by an applied electrical field strength, an electrical field being applied to selected linear areas of the diffraction efficiency changing layer and the scattered light that has exited from the low refraction index layer being diffracted at the selected linear areas to which the electrical field has been applied, the light-condensing optical system is disposed on an optical axis extending in a direction in which the scattered light is diffracted at the linear areas and focuses the diffracted light on the sensor unit in linear area units, the sensor unit converts the intensities of the focused light into electrical signals and outputs the electrical signals to the control circuit, and the control circuit performs a controlling operation so that the linear areas to which the electrical field is applied are successively selected in the direction of extension of the object placement surface, successively receives the electrical signals output in linear area units from the sensor unit, converts the electrical signals into pieces of linear image information, and joins these pieces of linear image information in order to produce a two-dimensional image.

2. An optical image reader comprising:

a first holographic diffraction grating element having an object placement surface and a diffraction efficiency changing layer whose diffraction efficiency changes by an applied electrical field strength, an electrical field being applied to selected linear areas of the diffraction efficiency changing layer;

an illumination light source for emitting light to an end face of the first holographic diffraction grating element;

a second holographic diffraction grating element disposed at a surface of the first holographic diffraction grating element opposite to the object placement surface via a transparent low refraction index layer having a refraction index that is lower than that of the opposite surface;

a sensor unit disposed near an end face of the second holographic diffraction grating element via a light-condensing optical system; and a control circuit connected to the first and second holographic diffraction grating elements and the sensor unit, wherein the first holographic diffraction grating element receives the light emitted from the illumination light source from the end face thereof, diffracts the light which propagates through the first holographic diffraction grating element towards the object placement surface by the linear areas to which the electrical field has been applied, and causes the diffracted light that is scattered by an object placed on the object placement surface to exit towards the low refraction index layer from the surface opposite to the object placement surface, the low refraction index layer totally reflects the light which propagates through the first holographic diffraction grating element, transmits a portion of the scattered light which has exited from the first holographic diffraction grating element, and causes the light to exit towards the second holographic diffraction grating element, the second holographic diffraction grating element has a diffraction efficiency changing layer whose diffraction efficiency changes by an applied electrical field strength, an electrical field being applied to selected linear areas of the diffraction efficiency changing layer and the scattered light that has exited from the low refraction index layer being diffracted at the selected linear areas to which the electrical field has been applied, the light-condensing optical system is disposed on an optical axis extending in a direction in which the scattered light is diffracted at the linear areas and focuses the diffracted light on the sensor unit in linear area units, the sensor unit converts the intensities of the focused light into electrical signals and outputs the electrical signals to the control circuit, and the control circuit performs a controlling operation so that the linear areas to which the electrical field is applied of the first and second holographic diffraction grating elements are successively selected in the direction of extension of the object placement surface, successively receives the electrical signals output in linear area units from the sensor unit, converts the electrical signals into pieces of linear image information, and joins these pieces of linear image information in order to produce a two-dimensional image.

3. The optical image reader according to claim 1, wherein the diffraction efficiency changing layer of the holographic diffraction grating element is sandwiched between a pair of transparent substrates, transparent electrodes for applying the electrical field to the diffraction efficiency changing layer are disposed on the inner sides of the transparent substrates, and the diffraction efficiency changing layer has first areas having an isotropic refraction index and second areas having a refraction index that is different from that of the first areas by the application of the electrical field.

4. The optical image reader according to claim 2, wherein the diffraction efficiency changing layer of each holographic diffraction grating element is sandwiched between a pair of transparent substrates, transparent electrodes for applying the electrical field to each diffraction efficiency changing layer are disposed on the inner sides of the transparent substrates, and each diffraction efficiency changing layer has first areas having an isotropic refraction index and second areas having a refraction index that is different from that of the first areas by the application of the electrical field.

5. The optical image reader according to claim 1, wherein the low refraction index layer totally reflects the light having an angle of incidence that is greater than $\sin^{-1}(n_h/n_l)$, and transmits the light having an angle of incidence that is equal to or less than $\sin^{-1}(n_h/n_l)$ (where $n_h$ is the refraction index of the transparent light guide plate, and $n_l$ is the refraction index of the low refraction index layer).

6. The optical image reader according to claim 2, wherein the low refraction index layer totally reflects the light having an angle of incidence that is greater than $\sin^{-1}(n_h/n_l)$, and transmits the light having an angle of incidence that is equal to or less than $\sin^{-1}(n_h/n_l)$ (where $n_h$ is the refraction index of the surface of the first holographic diffraction grating element adjacent to the low refraction index layer, and $n_l$ is the refraction index of the low refraction index layer).

7. The optical image reader according to claim 3, wherein the light to be diffracted by the linear areas to which the electrical field has been applied satisfies the following Bragg condition:

$$2\Lambda\cdot\sin\theta_i'=\lambda'$$

where $\Lambda$ represents the refraction index distribution period of the diffraction efficiency changing layer, $\theta_i'$ represents the angle between an equal refraction index surface in the diffraction efficiency changing layer and a light incidence path in the diffraction efficiency changing layer, and $\lambda'$ represents the effective wavelength of the light in the diffraction efficiency changing layer.

8. The optical image reader according to claim 4, wherein the light to be diffracted by the linear areas to which the electrical fields have been applied satisfies the following Bragg condition:

$$2\Lambda\cdot\sin\theta_i'=\lambda'$$

where $\Lambda$ represents the refraction index distribution period of each diffraction efficiency changing layer, $\theta_i'$ represents the angle between an equal refraction index surface in each diffraction efficiency changing layer and its associated light incidence path in each diffraction efficiency changing layer, and λ' represents the effective wavelength of the light in each diffraction efficiency changing layer.

9. The optical image reader according to claim 1, wherein a transparent low refraction index layer is disposed at the object placement surface.

10. The optical image reader according to claim 2, wherein a transparent low refraction index layer is disposed at the object placement surface.

* * * * *